J. W. COOPER.
Breast-Harness.

No. 228,175.    Patented June 1, 1880.

Witnesses:
Saml R. Turner
R. B. Dunkin

Inventor:
John W. Cooper
By R. S. & A. P. Lacey
Atty's

UNITED STATES PATENT OFFICE.

JOHN W. COOPER, OF NEW CASTLE, PENNSYLVANIA.

BREAST-HARNESS.

SPECIFICATION forming part of Letters Patent No. 228,175, dated June 1, 1880.

Application filed October 31, 1879.

*To all whom it may concern:*

Be it known that I, JOHN W. COOPER, of New Castle, in the county of Lawrence and State of Pennsylvania, have invented certain new and useful Improvements in Breast-Harness; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to provide a breast attachment for harness which will overcome the objections heretofore attending the use of this class of harness.

It consists in a breast plate or iron adapted to the form of the breast and neck of the animal, and which is composed of two wings hinged together, and provided with loops attaching the neck and shoulder straps, and in other mechanism, all of which will be fully hereinafter explained.

Figure 1:
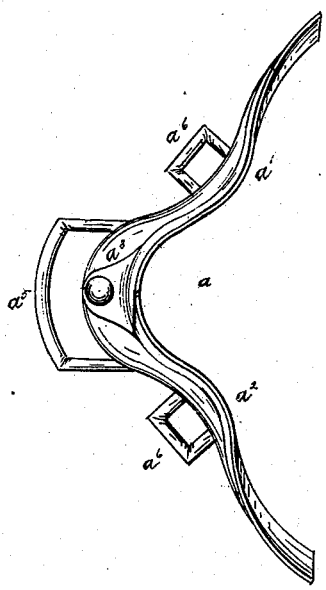
Figure 2:
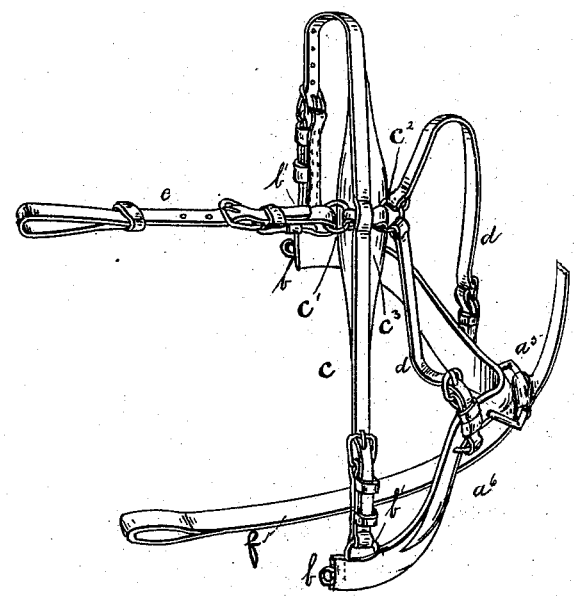
Figure 3:
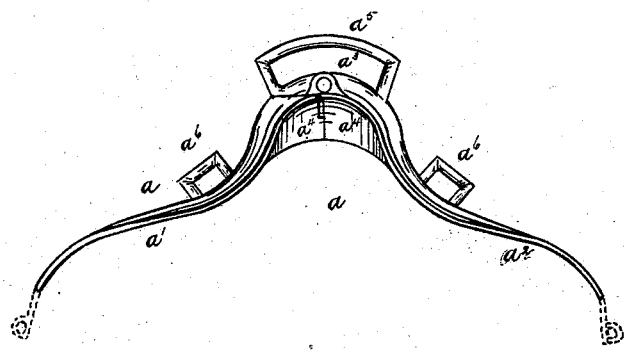

In the drawings, Figures 1 and 3 are views showing the construction of the breast-iron on its opposite sides, and Fig. 2 shows the iron covered and rigged to the shoulder and back straps of the harness.

$a$ is a breast iron or plate, made in two parts or wings, $a'$ $a^2$, which are hinged together at their abutting ends $a^3$, so that they will turn outward or inward, thus enlarging or lessening the size of the breast-plate to adapt it to the contour of the breast of different sizes of horses. The edges of the ends $a^3$ of the wings $a'$ $a^2$ are cut away by half-mortises, so that they overlap and form a neat joint, as shown in Figs. 1 and 2.

The abutting ends $a^3$ are made dome-shaped, and have their inner faces, $a^4$ $a^4$, beveled from their under edges upward and outward or forward, so as to give to the iron $a$ a form which will fit the slope of the animal's neck at the point where the neck and breast come together.

By preference, the abutting ends $a^3$ are so jointed that their hinge movement is limited to the expanding and contracting action which the muscular movement of the animal necessarily performs when drawing a load, the chief object being to provide a breast iron or plate which will be perfectly easy on the animal to which it is specially adapted.

I prefer to provide a breast-plate specially adapted for each animal on which it is used, though it will be readily seen that the plate may be so constructed as to be adapted to two or more animals of different sizes.

On the overlapping end of one of the wings, $a'$ or $a^2$, I fit the central martingale-loop, $a^5$, and outward on the wings I fix the loops $a^6$ $a^6$, as shown.

The breast-iron $a$ is covered with leather or other suitable material, as shown in Fig. 2, and to the outer ends, $b$ $b$, the braces are attached.

To the leather coverings I fix the rings or loops $b'$ $b'$, to which I attach the neck-strap $c$, of ordinary form, arrangement, and application. The neck-strap $c$ is provided with loops $c'$ $c^2$, affixed at the center of the pad $c^3$, which rests on the withers. The loop or wings may be attached to the outer ends of the wings $a'$ $a^2$, the latter being extended back to a proper distance to receive them.

Heretofore in breast-harness of ordinary construction it has been very objectionable to attach the neck-strap $c$ to the saddle or back-strap of the harness. This objection is overcome in my device.

Having the metal breast-plate $a$, I am enabled to attach to its loops $a^6$ the straps $d$ $d$, which pass upward over the shoulders of the animal and are fastened to the loop $c^2$ on top of neck. The beveled form at $a^4$ of the breast-plate prevents the latter from slipping up, so that the neck-strap $c$ may be attached to the saddle of the harness by the strap $e$.

A martingale, $f$, may be attached to the loop $a^5$, and constructed in usual form, so that it may be attached to the bridle-bit and to the belly-band in any usual or well-known manner.

Having described my invention, what I claim, and desire to secure by Letters Patent, is—

1. The metallic breast-plate $a$, formed with the beveled dome-shaped central arch, $a^4$, and the wings $a'$ $a^2$, the said wings being jointed at the center or forward end of the arch $a^4$, and extended and curved outward and backward to fit the neck and shoulders of the animal, substantially as and for the purposes set forth.

2. The combination, with the jointed breast-plate $a$, having the inner beveled and dome-shaped arch $a^4$, and provided with the loops $a^6$ and $b'$, and the neck-strap $c$, having loops $c'$ $c^2$, of the shoulder-straps $d$ $d$, having their lower ends attached to the loops $a^6$ and their upper ends attached to the loops $c^2$, substantially as and for the purposes set forth.

In testimony that I claim the foregoing as my own I affix my signature in presence of two witnesses.

JOHN W. COOPER.

Witnesses:
 G. D. KUESLER,
 H. G. MILLER.